(12) United States Patent
Lin

(10) Patent No.: US 9,333,945 B2
(45) Date of Patent: May 10, 2016

(54) REMINDER MESSAGES DELIVERY FROM REMINDER DEVICE WHEN TRIGGERED BY REMINDER-REQUIRED EVENTS

(75) Inventor: Bo-In Lin, Los Altos Hills, CA (US)

(73) Assignee: Bo-In Lin, Los Altos Hills, CA (US)

( * ) Notice: Subject to any disclaimer, the term of this patent is extended or adjusted under 35 U.S.C. 154(b) by 0 days.

(21) Appl. No.: 13/567,074

(22) Filed: Aug. 5, 2012

(65) Prior Publication Data

US 2012/0293341 A1 Nov. 22, 2012

Related U.S. Application Data

(62) Division of application No. 12/386,908, filed on Apr. 23, 2009, now abandoned.

(51) Int. Cl.
*G08B 1/08* (2006.01)
*B60R 25/00* (2013.01)

(52) U.S. Cl.
CPC ...................................... *B60R 25/00* (2013.01)

(58) Field of Classification Search
CPC ....................................................... B60R 25/00
USPC ............... 340/989, 540, 541, 573.1; 701/469, 701/483, 484
See application file for complete search history.

(56) References Cited

U.S. PATENT DOCUMENTS

| | | | |
|---|---|---|---|
| 2008/0001735 A1* | 1/2008 | Tran ......................... | 340/539.22 |
| 2009/0040048 A1* | 2/2009 | Locker et al. .............. | 340/572.1 |
| 2010/0004005 A1* | 1/2010 | Pereira et al. ................ | 455/457 |
| 2010/0149030 A1* | 6/2010 | Verma et al. ............. | 342/357.09 |
| 2010/0225493 A1* | 9/2010 | Zishaan .............. | F24F 11/0017 340/627 |
| 2011/0257491 A1* | 10/2011 | Robertson et al. ............ | 600/302 |

* cited by examiner

*Primary Examiner* — Ojiako Nwugo
(74) *Attorney, Agent, or Firm* — Bo-In Lin

(57) ABSTRACT

The present invention discloses a method to deliver a reminder message. The method includes a step of triggering a delivery of the reminder message upon detecting or sensing a reminder message required event-or-activity to prevent a person from forgetting or losing a person item. In an exemplary embodiment, the step of sensing the reminder message required event-or-activity includes a step of detecting or sensing an activity when the person preparing to leave a place for a next destination.

6 Claims, 3 Drawing Sheets

REMINDER MESSAGES DELIVERY FROM REMINDER DEVICE WHEN TRIGGERED BY REMINDER-REQUIRED EVENTS

This patent application is a Divisional application and claims the Priority Date of a co-pending application Ser. No. 12/386,908 filed on Apr. 23, 2009 now abandoned by a common Inventor of this application. The Disclosures made in the patent application Ser. No. 12/386,908 are hereby incorporated by reference.

BACKGROUND OF THE INVENTION

1. Field of the Invention

This invention relates generally to the systems, the devices and methods for preventing a device user from forgetting and losing important personal items as the user moves between different locations. More particularly, this invention is related to a reminder device implemented with a trigger for triggering an audio output for pronunciation of a designated reminder message upon a specific reminder-required activity.

2. Description of the Prior Art

The problem of forgetting important personal items when a person moves from one location to another becomes very annoying. It is desirable to provide a device to remind a person to check important personal items such as wallet, cellular phone, coat, eye glasses, airline ticket, passport, etc., before leaving for next destination such that forgetting and losing important personal items may be prevented.

Many patents and patent applications have disclosed reminder devices. However, such devices are generally related to reminding a person to carry out certain activities such as take medications, at particular time of the day. The device for providing reminder messages at designated times is however not practically useful for reminding a person to check and prevent the loss of important personal items due to the fact that the activities are usually taking place at different times of the day. A reminder message that is provided at fixed time according to a predefined schedule generally will not satisfy the requirement of timely providing a requirement message when such reminder messages are necessary and required because a pending event or activities is soon to take place.

In Published US Application 20070129888, a spatially associated personal reminder system is disclosed. The device enables users to create reminders and associate those reminders with entering/exiting particular trigger areas. A user's portable computing device triggers an alert/displays a reminder based upon a user entering and/or exiting a trigger area. A user interface supported by the portable computing device allows a user to terminate the reminder so it will not trigger again, to defer the reminder so it triggers again after an elapsed time, to reset the reminder so that it triggers again only if a user leaves the area and then returns, to request a last chance, causing the portable computing device to remind the user again upon exiting the area to ensure the user did not forget to act upon the reminder, or to edit the reminder. The user interface also enables users to graphically define trigger areas within the physical world to be associated with personal digital reminders using geo-spatial imagery.

However, such system and method is still limited in the practically usefulness due to the facts that the reminder messages are related to particular locations. A person often travels to very different kinds of places that have different geo-spatial imagery. The triggering of a digital reminder depending on locations and the characteristics that are spatially associated will not effectively resolve the problems faced by a typical device user.

Therefore a need still exists to provide new and improve system to resolve the difficulties and limitations discussed above.

SUMMARY OF THE PRESENT INVENTION

It is therefore an aspect of the present invention to provide new and improved devices, systems, and method to provide reminder messages by anticipating and detecting activities or events that would generally require a reminder message. A reminder message device is provided with detector or sensor to detect such activities or events to trigger the delivery of such reminder messages. The delivery of such messages may be in different forms including textual display of a short message on a wireless communication device, an audio pronunciation, or a voice mail that a person may listen privately on a cellular phone a device with an earphone.

Specifically, it is an aspect of the present invention to provide a novel device for detecting an event related to entering or driving a car to travel to a destination. Detector and sensors are provided to detect activities of opening a car door by using a electronic car key, turning on the roof light when entering into the car, or pushing down the gas pedal to accelerate the car to a certain speed that results an initial acceleration and movement of a device carried on the car to at certain speed. A reminder message is delivered when sensing or detecting such events or activities.

Another aspect of the present invention is to detect a user's activity in preparing to leave a place to travel to next destination. The activities include placement of a car key in a pocket or purse and then taking the car key from the pocket or purse. The activities may include pulling up a handle of a wheeled luggage or turning on a cellular phone after an airplane is landed before the passengers are ready to leave the airplane cabinet. The activities may also include turning off a notebook computer and place the computer into a luggage. These typical activities provide indications that a reminder message may be necessary because a person is preparing to leave. A reminder device in this invention is provided with sensors or detectors to detect such events or activities to deliver reminder messages.

Briefly, in a preferred embodiment, the present invention discloses a reminder message device that is provided for triggering by an event or an activity to deliver a reminder message. In a preferred embodiment, the reminder message device is integrated with an electronic door opener for a car and triggered by a door-opening signal of the electronic door opener to deliver a reminder message. In another exemplary embodiment, the reminder message device is integrated with a roof light inside the car and is triggered by turning on of the roof light in opening a car door for delivering the reminder message. In another preferred embodiment, the reminder message device is implemented in a wireless communication device such as a cellular phone or a Personal Digital Assistant (PDA) device and is triggered by a turning of operation of the wireless communication device for delivering the reminder message. In another exemplary embodiment, the reminder message device is implemented in car key that includes a light sensor. The reminder message is triggered by a sudden change of an intensity of light detector by the light sensor to deliver the reminder message. In another exemplary embodiment, the reminder message device is implemented with a portable electronic device that includes a global position system (GPS) to detect a motion of a certain speed to deliver the reminder message. Another preferred embodiment, the reminder message device is implemented with a portable electronic device by including an accelerometer to detect an acceleration to deliver the reminder message. In another exemplary embodiment, the reminder message device is disposed on a pull-up handle of a wheeled luggage that includes an accelerometer to detect a pull-up operation of the pull-up handle to deliver a reminder message.

In summary reminder message device for delivering a reminder message is disclosed in this invention. The reminder message device includes a reminder message delivering circuit provided for triggering by a reminder-message event or activity to deliver a reminder message. In an exemplary embodiment, the reminder message delivering circuit is triggered to deliver an audio output of the reminder message. In another exemplary embodiment, the reminder message delivering circuit is triggered to deliver a text message for receiving by a wireless communication device as a short message (SM). In another embodiment, the reminder message delivering circuit is triggered to deliver a message to a wireless communication device as a phone message of as a voice mail message. In an exemplary embodiment, the message delivering circuit is triggered by an activity of a user when preparing to leave for another destination. In another exemplary embodiment, the message delivering circuit is triggered by an event indicating a device user is moving at a certain speed or acceleration in moving from one location to a destination.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 2A is an reminder message device integrated with a roof light inside a car for providing reminder message to a driver and passengers in the car when the car door is opened and the roof light is turned on.

DETAILED DESCRIPTION OF THE PREFERRED EMBODIMENT

Figure 1:
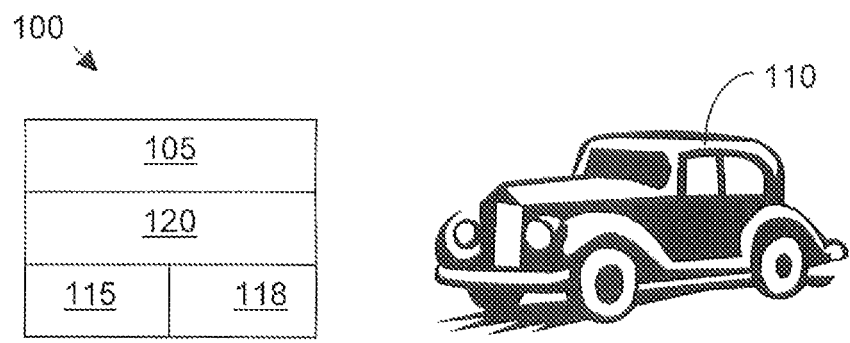
FIG. 1 shows an electronic door opener for a vehicle integrated with a reminder message device of the present invention.

FIG. 1 shows an exemplary embodiment of an electronic door opener 100 for a vehicle of the present invention. The electronic door opener 100 includes a door control signal transmitter 105 to transmit door control signals to either unlock or lock a door of a vehicle 110. The electronic door opener 100 further includes a reminder message processor 115 with a pronunciation audio port 118 to pronounce a reminder message when the user of the electronic door opener operate the electronic door opener 100 either to lock or unlock the door of the vehicle 110. The electronic door opener 100 further includes a user interface 120 to allow the user of the door opener 100 to designate specific reminder messages to remind the user of the door opener not to forget either the personal items or important events. The reminder message may include message to remind the user of the electronic door opener about personal items such as wallet, cellular phone, passport, eyeglasses, or any items that the user of the electronic door opener may forget when opening the door of a vehicle to drive to another location. The messages may be changed or inputted to the reminder message processor 115 depending on the circumstances that would demand such reminder message.

Figure 2A:
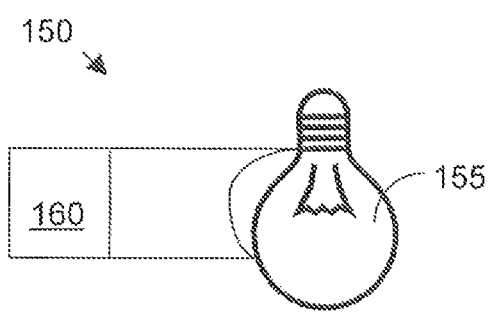

FIG. 2A shows an alternate embodiment of a reminder message device 150 integrated with a roof light 155 having outer screws for screwing onto the roof light adapting outlet. The reminder message device further includes a timer 160 for setting a predefined time delay to allow a driver to enter and sitting in the car then pronounce a reminder message to reminding the driver or passenger(s) of the car not to forget to check the personal items. Generally, the roof light 155 is turned on when the door car is opened and the roof light will usually stay on for a short time period. As the power is on, the reminder device 150 is turned on also to pronounce designated reminder messages to remind a driver or a passenger of the vehicle about personal items or important event.

Figure 2B:
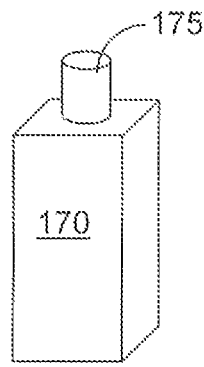
FIG. 2B is an reminder message device for plugging into a cigarette lighter in a car that is turned on as an ignition key is turned to startup a car for provide a reminder message to a driver and passengers in the car.

FIG. 2B is a perspective view for showing an alternate embodiment of reminder message device 170 that includes a cigarette lighter plug 175 for plugging into a cigarette lighter in a car. As the ignition key of the car is turned on, it also turn on the cigarette lighter thus providing power to the reminder message device 170 to pronounce the reminder messages for reminding the person sitting in the car before the car is driven off not to forget important personal items.

Figure 3A:
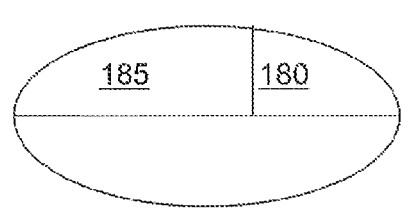
FIG. 3A shows a reminder message device implemented together with a cellular phone as a special feature of the cellular phone.

FIG. 3A shows another exemplary embodiment of a reminder message device 180 implemented together with a cellular phone 185 as a special feature of the cellular phone 185. The cellular phone is usually turned on when an airplane is landed and the passengers are ready to leave the airplane cabinet. As the cellular phone 185 is turned on, the reminder messages may be presented to the cellular phone user either as a short message (SM) displayed on the screen of the cellular phone. Alternately, the reminder message may be directly pronounced from the phone as an audio output. Or, alternately, the reminder message device may just send a ring to the cellular phone for the cellular phone user to push a button to listen to the reminder messages as a voice mail. The cellular phone user thus receives the reminder messages as private messages instead of directly pronouncing the messages in the public place. The reminder message device may be integrated with other kinds of portable electronic devices in addition to a cellular phone, such as a personal digital assistance (PDA), a digital camera, a global-position system (GPS) device, an iPod, a portable DVD device, or any other kind of portable electronic devices. The reminder messages device implemented with these devices may be turned on soon as these devices is turned on to provide the reminder messages either as direct audio output, a text message in the form of a short-message or a voice mail message that a device user can listen as a private message from these devices.

Figure 3B:
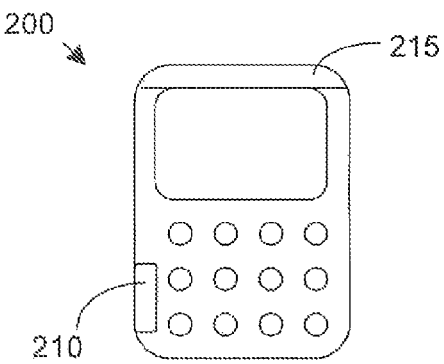
FIG. 3B shows a portable electronic device implemented with a reminder message processor that includes a reminder-message requirement detector to detect a reminder message required activity.

FIG. 3B shows another exemplary embodiment of a reminder message device implemented in a portable electronic device such as a cellular phone, a personal digital assistance (PDA), a digital camera, a global position system (GPS) device, or any other types of portable electronic devices. The portable electronic device 200 is implemented with a reminder message processor 210. The reminder message processor 210 includes a reminder-message requirement detector 215 to detect a reminder message required activity. The detection of such activity may include the detection of a signal transmitted to a car to unlock a car door or to open or close a garage door. Such activities would often require the pronunciation of a reminder message because the device of the portable electronic device 200 is probably driving from one location to another location. The reminder message processor 210 may include a user interface to allow a user to input or designate reminder message required activities and reminder messages. For instance, a cellular phone often includes a GPS for detecting the location of the user. When the GPS detects the rate of location change of the user as the user of the phone is riding in the car is greater than the walking speed, then a reminder message may be pronounced because the user of the cellular phone is now moving from one location to another in a vehicle and a reminder message may be necessary.

Figure 3C:
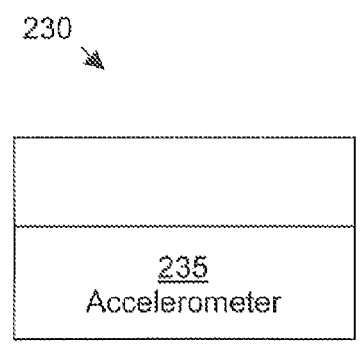
FIG. 3C shows a portable electronic device implemented with a reminder message processor that includes a reminder-message requirement detector such as an accelerometer detect a reminder message required activity.

Alternately, FIG. 3C shows that portable electronic device 230 may include an accelerometer 235 to detect an acceleration, e.g., when a car is driven off initially with an acceleration greater than a threshold value, and turning on the reminder message device to provide reminder messages in different forms such as a text message, a direct voice reminder or a voice mail message.

Figure 3D:
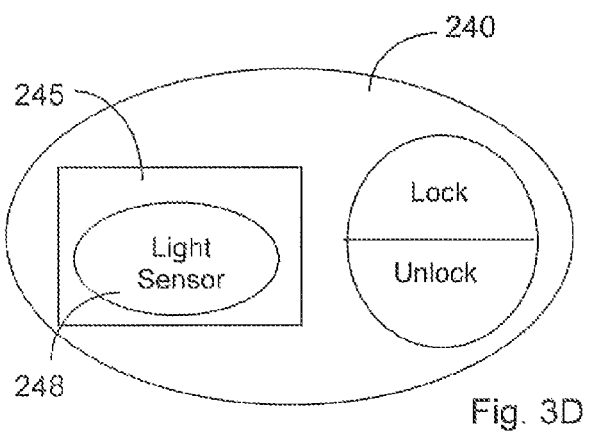
FIG. 3D shows a portable electronic device such as an electronic car door opener implemented with a reminder message device that includes a light sensor.

FIG. 3D shows a portable electronic device such as an electronic car door opener 240. The electronic car door opener is implemented with a reminder message device 245 that includes a light sensor 248. As a user of the electronic car door opener 240 ready to leave a room, the electronic car door opener 240 is either placed into a pocket or a purse or alternately the car door opener is taken out from a pocket or a pulse. The light sensor will detect a sudden light intensity change. The sudden large amount of light intensity change provide a signal to the reminder message device 245 to turn on and provide the reminder messages in either a text message, a direct pronounce voice message, or a voice mail type of message.

Figure 4:
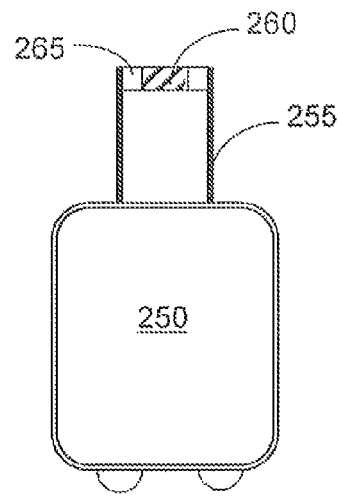
FIG. 4 shows a reminder message device implemented with a luggage that has a pull-up handle and reminder message device has an accelerometer to detect the pull-up motion of the pull-up handle when the user of the luggage is ready to leave.

FIG. 4 shows an alternate embodiment of a reminder message device of this invention implemented with a luggage 250 that has a pull-up handle 255. A reminder message device 260 is formed as part of the pull-up handle by placing the reminder message device 260 as part of the top bar 265 of the pull-up handle. The reminder message device further includes an accelerometer to detect the pull-up motion of the pull-up handle 255 when the user of the luggage is ready to leave. The accelerometer of the reminder message device 260 can be further turned on as the luggage is placed in a car and the car is driven off. Acceleration of the car together with the luggage is detected by the accelerometer included in the reminder message device 260 to turn on the reminder message device to provide the reminder message as a text message, a direct pronounce voice message or a voice mail type of message.

Figure 5:
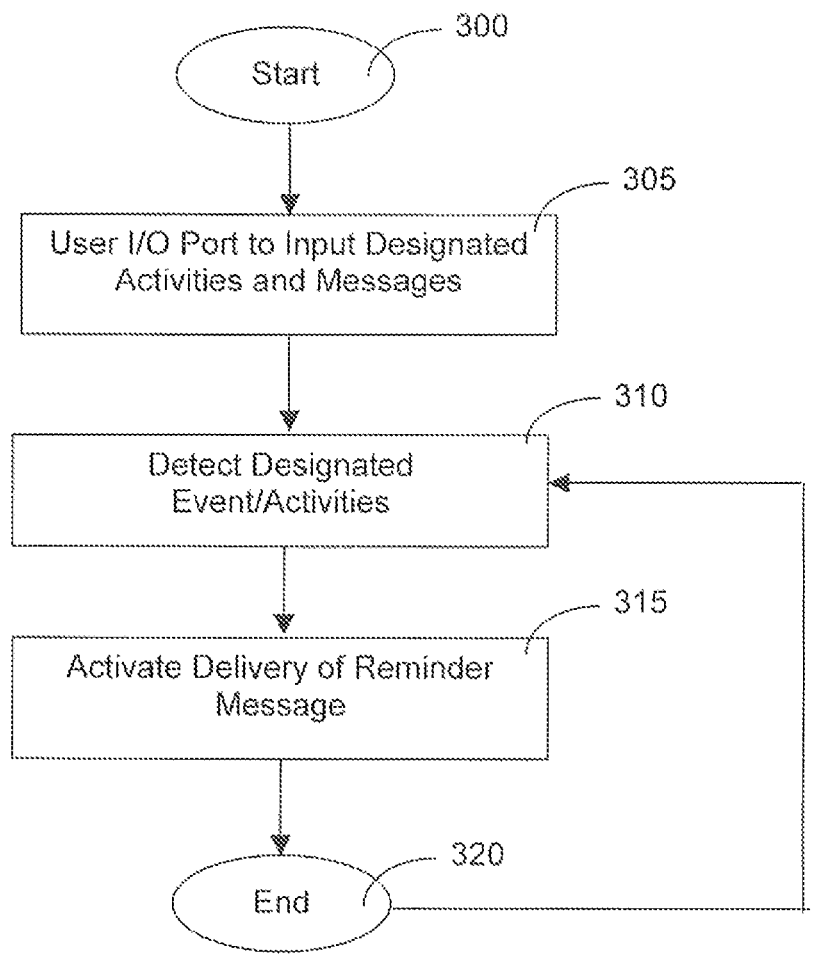
FIG. 5 is flowchart to show the process steps carried out by a reminder message processor implemented in a reminder message device.

FIG. 5 is a flowchart for illustrating the processes of implementing in a portable electronic device to trigger the pronunciation a reminder message to a user of the portable electronic device. The process starts (step 300) with a user of an electronic device input through a user interface designated activity and corresponding reminder messages (step 305). Then the electronic device starts a process of detecting of a reminder message required activity according to the designated activity inputted by the device user (step 310). The reminder message required activity might include activity of opening of a garage door or turn on the ignition key of a car, etc. Upon the detection of the reminder message required activity, the reminder message processor activate the audio output port to pronounce the reminder messages as inputted and designated by the electronic device user (step 315), then the process ends (step 320) and return to the step of detecting whether there is a reminder message required activity again (step 310).

According to above descriptions, this invention discloses a method to deliver a reminder message. The method includes a step of triggering a delivery of the reminder message upon detecting or sensing a reminder message required event-or-activity to prevent a person from forgetting or losing a person item. In an exemplary embodiment, the step of sensing the reminder message required event-or-activity includes a step of detecting or sensing an activity when the person preparing to leave a place for a next destination. In another exemplary embodiment, the step of sensing the reminder message required event-or-activity includes a step of detecting or sensing an activity when the person preparing to drive a motor vehicle. In an exemplary embodiment, the step of sensing the reminder message required event-or-activity includes a step of detecting or sensing an activity when the person turning on a wireless communication device after an airplane is landed. In an exemplary embodiment, the step of sensing the reminder message required event-or-activity includes a step of detecting or sensing an activity when the person preparing to leave an airline cabinet. In an exemplary embodiment, the step of sensing the reminder message required event-or-activity includes a step of detecting or sensing an event when the person is traveling in a motor vehicle over a certain speed or having an initial acceleration when the motor vehicle starts to drive to reach a certain traveling speed. In another exemplary embodiment, the reminder message is delivered optionally in different kinds of messages as a text short message, a direct audio pronunciation message, a phone message, or a voice mail message.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A luggage having a pull out handle, comprising:
   a reminder device attached to the pull out handle of the luggage, the reminder device further comprises
   a memory device;
   an input/output (I/O) port to allow a user to input a reminder message into the memory device to remind the user of personal items easily forgotten when the user intend to leave a location, and for transmitting the reminder message directly to a cellular phone as an inter-device transmitted reminder message when a handle of the luggage is pulled out by the user as a user's action activated triggering event to activate and trigger a transmission of the inter-device transmitted reminder message before the user leaves the location;
an accelerometer to sense said user's action of luggage handle pull out; and
a transmitter device to transmit said inter-device transmitted reminder message in response to sensing said user's action of luggage handle pull out.

2. The luggage of claim 1 wherein:
the reminder device further directly transmits the inter-device transmitted reminder message as a text message on a display panel on the cellular phone.

3. The luggage of claim 1 wherein:
the reminder device further directly transmits the inter-device transmitted reminder message as an audio reminder message on the cellular phone when the handle of the luggage is pulled out.

4. The luggage of claim 1 wherein:
the reminder device further includes an accelerometer for detecting an acceleration as an acceleration activated inter-device message transmission triggering event to directly transmit the inter-device transmitted reminder message to the cellular phone when the luggage in an automobile is moved with the acceleration detected by the accelerometer.

5. The luggage of claim 4 wherein:
the reminder device further directly transmits the inter-device transmitted reminder message as a text message on a display panel of the cellular phone when the accelerometer detects the acceleration.

6. The luggage of claim 4 wherein:
the reminder device further directly transmits the inter-device transmitted reminder message as an audio reminder message when the accelerometer detects the acceleration.

* * * * *